April 14, 1925.
L. M. BROWN
1,533,723
GRADOMETER
Filed Feb. 15, 1924
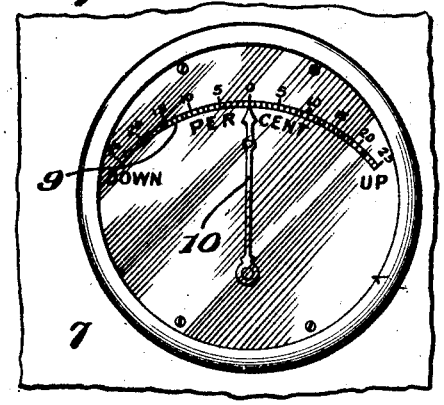
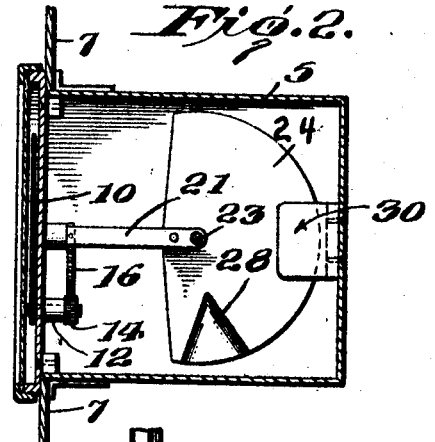
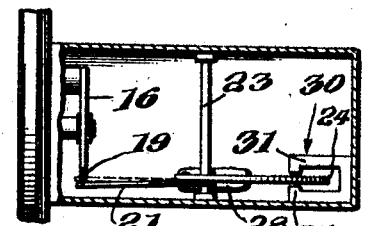
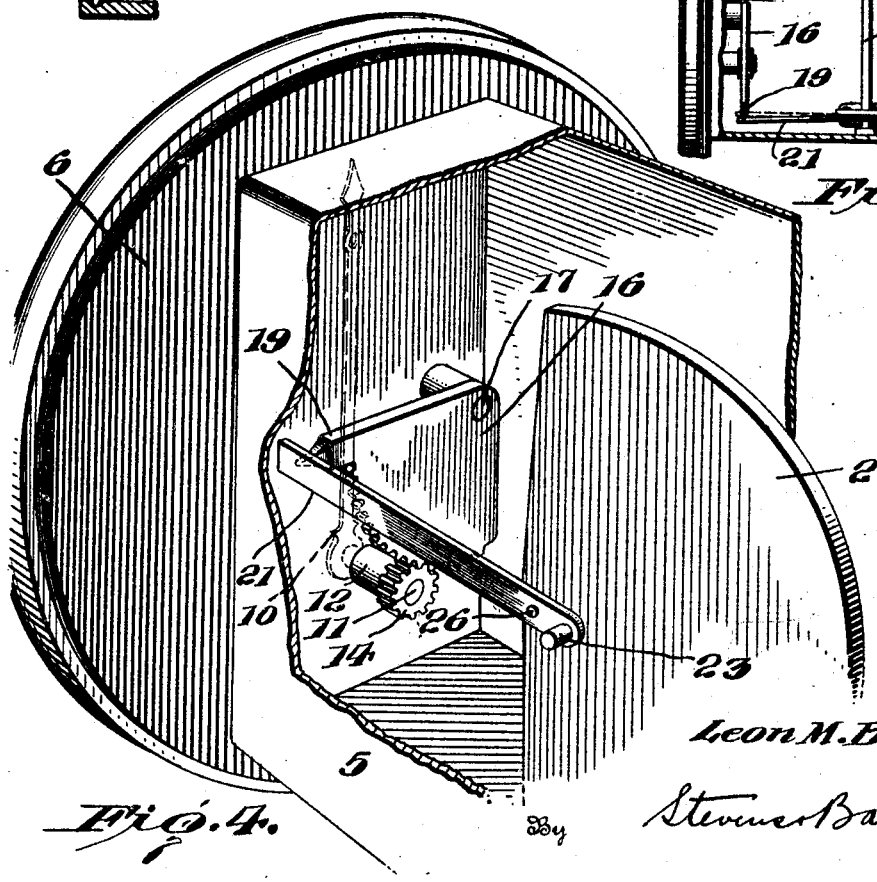
Inventor
Leon M. Brown,
By Stevens Batchelor
Attorneys Patented Apr. 14, 1925.

1,533,723

UNITED STATES PATENT OFFICE.

LEON M. BROWN, OF SPOKANE, WASHINGTON.

GRADOMETER.

Application filed February 15, 1924. Serial No. 693,079.

*To all whom it may concern:*

Be it known that I, LEON M. BROWN, a citizen of the United States, residing at Spokane, in the county of Spokane and State of Washington, have invented certain new and useful Improvements in Gradometers, of which the following is a specification.

This invention relates to gradometers especially adapted for use on motor vehicles, aeroplanes, and the like.

Briefly stated, an important object of this invention is to provide a gradometer having simple and reliable means to indicate the extent of inclination of the vehicle and the invention is provided with simple means to damp the action of the indicator.

A further object of the invention is to provide a gradometer which is of highly simplified construction, durable in use, and which requires practically no attention.

Other objects and advantages will be apparent during the course of the following description.

In the accompanying drawing forming a part of this application and in which like numerals are employed to designate like parts throughout the same, Figure 1 is a front elevation of the improved gradometer applied;

Fig. 2 is a vertical transverse sectional view through the same;

Fig. 3 is a fragmentary plan view of the gradometer, the casing being shown partly in section to expose the operating mechanism;

Fig. 4 is a fragmentary perspective, the casing being shown in section to illustrate the operating mechanism, and Fig. 5 is a detail view illustrating the connection between the lever and the gear segment for operating the hand or pointer.

In the drawing, wherein for the purpose of illustration is shown a preferred embodiment of the invention, the numeral 5 designates a casing of rectangular formation and formed from brass, bronze or the like. Fig. 4 illustrates that a dial 6 is attached to the forward end of the casing and is somewhat greater in diameter than the width and thickness of the casing so that the casing when extended through a dash 7 or other support will be completely concealed. The dial 6 is designed to be mounted flatly on the dash 7 at right angles to the path of travel of the vehicle and is provided with graduations 9 over which the pointer 10 plays whereby the inclination of the vehicle is indicated. It is obvious, however, that the indicator may be calibrated to indicate in degrees or terms of percentage the inclination of the vehicle. Furthermore, such calibration will also take into consideration the tendency, if any, of the spring 21 to urge the member 16 to an extreme position.

The pointer 10 is mounted on a shaft 11 rotatably extended through a bearing 12 carried by the front wall of the casing. Fig. 4 illustrates that a pinion 14 is mounted on the shaft 11 and is engaged by the teeth of a gear segment 16 mounted for turning movement on a pin or shaft 17. It will be seen that when the gear segment 16 is rocked the pinion 14 will be rotated for moving the hand or pointer 10 over the graduations on the dial whereby to indicate the extent of inclination of the vehicle.

With particular reference to Fig. 4 it will be observed that one side of the gear segment 16 is provided with a radial extension 19 tapered to more or less of a point and extended into a socket 20 in the outer end portion of a spring arm 21.

This spring arm is in turn connected to the supporting shaft 23 of a disk or segment 24 preferably of aluminum. The spring arm 21 is also attached to the segment 24 as indicated at 26 so that as the segment 24 is rocked the spring arm will be moved about the axis of the supporting shaft 23 for operating the pointer 10.

Fig. 2 plainly illustrates that the lower portion of the member 24 is weighted with lead 28 by means of which the disk is turned when the inclination of the vehicle is varied. Attention is especially directed to the fact that the inherent flexibility of the arm 21 maintains the arm in engagement with the tapered extension 19 regardless of the position of the instrument. When the pointer 10 is pointing to zero the arm 21 is curved longitudinally as indicated in Fig. 3 and when the hand moves to one of its extreme positions the arm 21 is straightened to compensate for the increased distance between the extension 19 and the shaft 23. In other words, the flexibility of the arm 21 compensates for the varying distances between the extension 19 and the supporting shaft 23.

The action of the weighted member 24 is dampened by a horseshoe magnet 30 clearly illustrated in Fig. 3 as being provided with spaced parallel sides 31 disposed on opposite sides of the disk 24 and adapted to exert a magnetic influence on the same so that the instrument is not rendered too responsive or sensitive. However, the magnet 30 does not in any way render the instrument slow to respond to major changes in inclination. It might be said that the magnet 30 stabilizes the hand 10 and allows the same to move to the proper position and remain there without jumping back and forth.

The horseshoe magnet 30 not only damps the action of the instrument, but also holds the disk against excessive lateral movement as the inwardly projecting lugs 34 on the ends of the sides 31 are arranged close to, but are spaced from the opposite sides of the disk. It is important to note that the inwardly projecting lugs 34 are arranged adjacent to the outer portion of the disk 24 and consequently the outer portion of the disk is braced and prevented from bending as a result of the lateral inclination of the vehicle or strains to which the instrument may be subjected during use.

With reference to the foregoing description taken in connection with the accompanying drawing it will be seen that an indicator constructed in accordance with this invention will quickly indicate the position of the aeroplane, land vehicle, or the like, with respect to the earth and as the parts are comparatively few in number the same do not easily get out of repair and consequently the instrument requires practically no attention. The instrument may be quickly and conveniently applied to a dash 7 or other support without the exercise of unusual skill and is, of course, located in plain view of the operator.

Having thus described the invention, what is claimed is:

1. A gradometer comprising a casing, a dial connected to the casing and having graduations, a shaft extending through the dial and having a hand playing over the graduations, a gear connected to said shaft, a second gear meshing with said first named gear and having a radial extension, a spring arm pressing against said extension, and a weighted operating member having connection with said spring arm for operating the same.

2. A gradometer comprising a casing, a dial connected to the casing and having graduations, a shaft extending through the dial and having a hand playing over the graduations, a gear connected to said shaft, a second gear meshing with said first named gear and having a radial extension, a spring arm having connection with said extension, a weighted operating member having connection with said spring arm for operating the same, and a magnet damping the action of said weighted operating member.

3. A gradometer comprising a casing, a dial having connection with the casing, a hand playing over the dial, a gear having connection with the hand and having a radial extension tapered toward the free end thereof, a spring arm having a socket receiving the terminal portion of said extension, a weighted member mounted for movement in said casing and having connection with said spring arm for operating the same, and means to damp the action of said weighted member.

4. A gradometer comprising a casing, a weighted segment arranged in the casing, a main supporting shaft carried by the casing and supporting said segment, a spring arm connected to said shaft and arranged at one side of said weighted segment, means securely connecting the spring arm to said segment at a point spaced from said shaft, and an indicating hand in operative connection with said spring arm.

5. A gradometer comprising a casing, a main supporting shaft arranged within the casing, a weighted operating member connected to said shaft, a spring arm connected to said shaft and to said weighted member, a gear having an extension in operative connection with said spring arm, and an indicating hand operated by said gear.

6. A gradometer comprising a casing, a main supporting shaft arranged within the casing, a weighted segment mounted on said shaft, a spring arm connected to said segment and said shaft and having a socket, a gear segment having a radial extension extending into said socket, and an indicating hand operated by said gear segment.

7. A device of the character described comprising an operating member, a spring arm extending from and connected to the operating member, and a motion transmitting member movable in a plane approximately at right angles to the plane of said operating member and engaged by said spring arm, the flexibility of said spring arm constituting means to compensate for varying distances between the spring arm engaging points of the operating member and said motion transmitting member.

In testimony whereof I affix my signature.

LEON M. BROWN.